Figure 1:
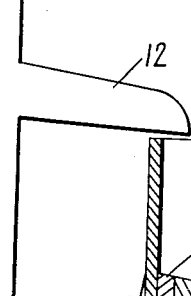

E. J. SWEETLAND.
GAS DIFFUSER.
APPLICATION FILED SEPT. 12, 1916.

1,403,578.

Patented Jan. 17, 1922.

5 SHEETS—SHEET 1.

Ernest J. Sweetland Inventor

By his Attorney

G. E. Terwilliger

E. J. SWEETLAND.
GAS DIFFUSER.
APPLICATION FILED SEPT. 12, 1916.

1,403,578.

Patented Jan. 17, 1922.
5 SHEETS—SHEET 2.

Ernest J. Sweetland Inventor
By his Attorney
G. E. Terwilliger

E. J. SWEETLAND.
GAS DIFFUSER.
APPLICATION FILED SEPT. 12, 1916.
1,403,578.
Patented Jan. 17, 1922.
5 SHEETS—SHEET 3.
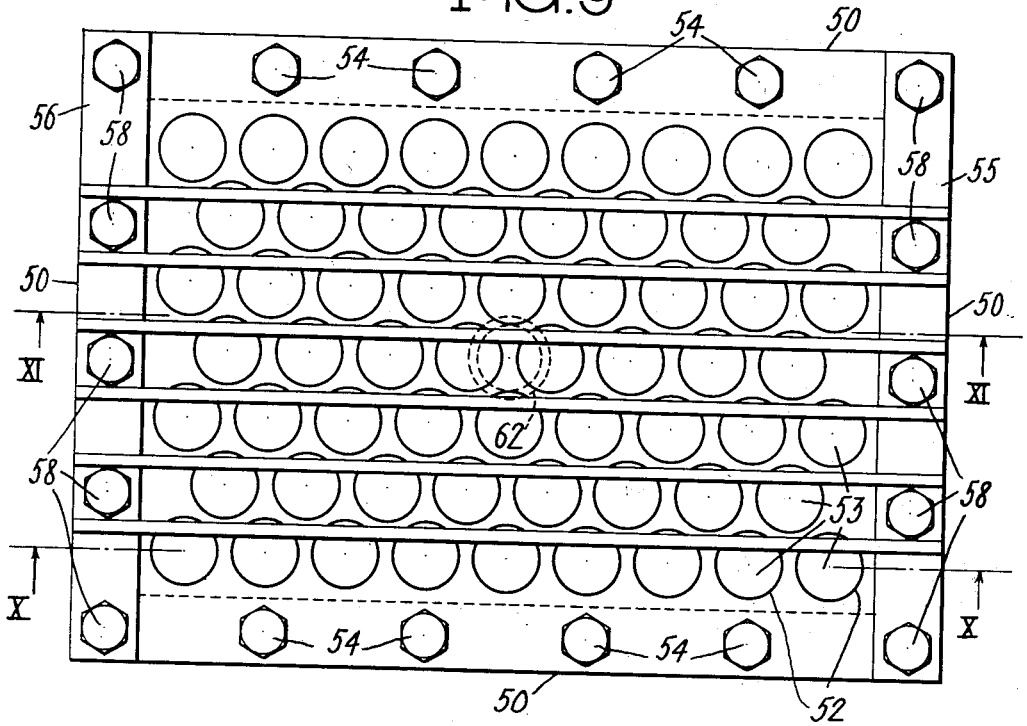
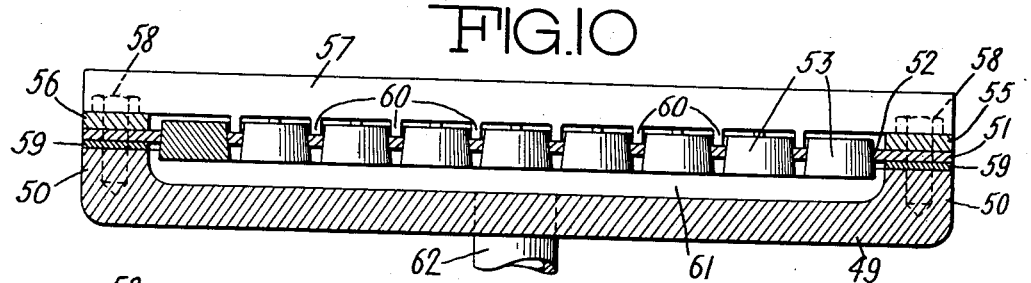
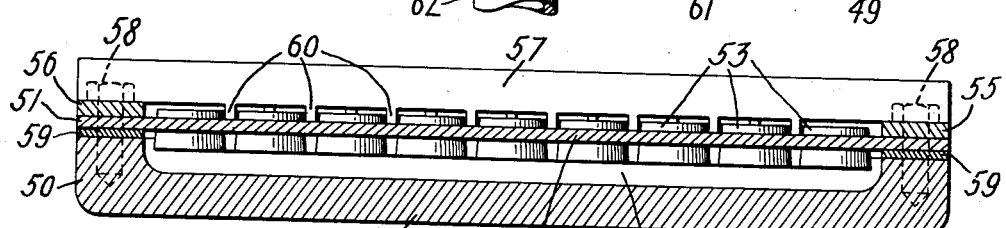
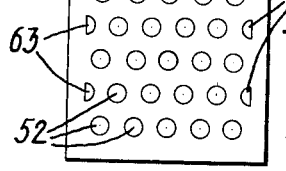
Inventor
Ernest J. Sweetland
By his Attorney
G. E. Terwilliger

E. J. SWEETLAND.
GAS DIFFUSER.
APPLICATION FILED SEPT. 12, 1916.

1,403,578.

Patented Jan. 17, 1922.
5 SHEETS—SHEET 4.

Inventor
Ernest J. Sweetland
By his Attorney
G. E. Terwilliger

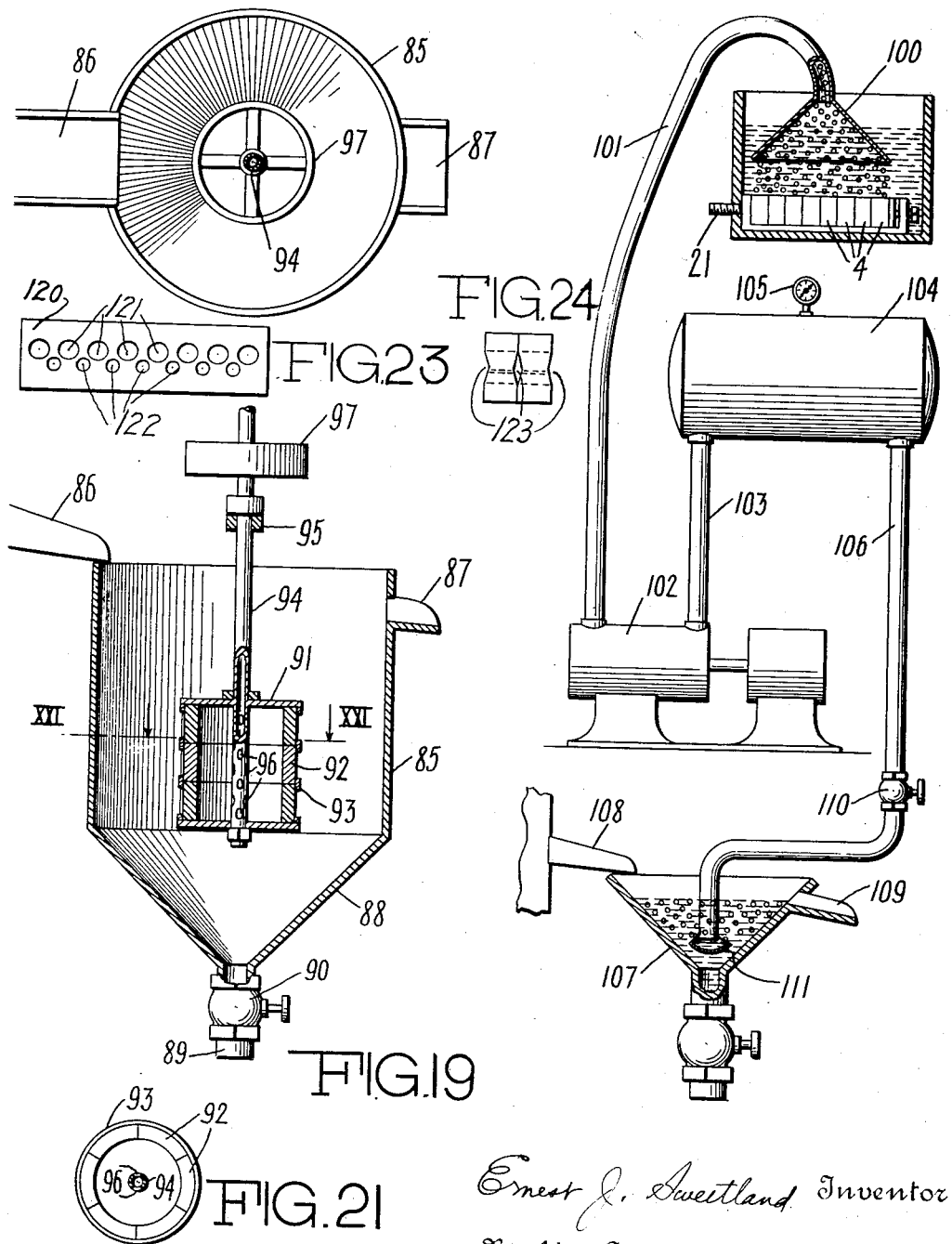

UNITED STATES PATENT OFFICE.

ERNEST J. SWEETLAND, OF MONTCLAIR, NEW JERSEY.

GAS DIFFUSER.

1,403,578.   Specification of Letters Patent.   Patented Jan. 17, 1922.

Application filed September 12, 1916. Serial No. 119,747.

*To all whom it may concern:*

Be it known that I, ERNEST J. SWEETLAND, residing in Montclair, in the county of Essex and State of New Jersey, have invented certain new and useful Improvements in Gas Diffusers, of which the following is a specification.

My invention relates broadly to means designed to break up gases, such for instance as air, into fine bubbles, which are useful in connection with many processes, such for instance, as in the activation of sewage, the aeration of water and the like, ore separation by flotation, and also in connection with gas scrubbers, in effecting a solution of a gas in a liquid and in the clarification of liquid products which contain finely divided solids in suspension. In all these uses, it is desirable to obtain the air or other gas in the form of bubbles which are as minute as practicable, and many efforts have been made to construct devices which will convert the air or other gas into such finely divided form when released into a liquid. I am aware that it has been proposed to create fine bubbles by passing compressed air through woven fabric, such as canvas, but the use of such fabric entails many disadvantages. The fabric does not possess sufficient inherent strength to oppose the pressure of the air to which it is subjected and it consequently must be reenforced at frequent points. Furthermore, the canvas is readily abraded by any hard substance passing over it, and finally the bubbles created in this fashion are not uniform in size or number over a given area nor are they nearly as minute as those which are obtained by utilizing my improved devices.

In practicing my invention, I pass the air or other gas which it is desired to break up through a vegetable medium provided with thousands of natural pores to the square inch. For instance, the pores of ordinary pine wood provide innumerable parallel capillary passages which are admirably adapted to break up the air or other gas passed through the wood into a correspondingly large number of extremely minute columns, and when the surface of the wood is covered with water, the air emerges in the form of correspondingly small bubbles. I have found that pine wood as well as many other kinds of wood and vegetable growths are relatively porous to the passage of air, so that for example, under a pressure of only five pounds per square inch, air passes readily through a wooden block two inches in length, and if the other end of the block is submerged in water or other liquid, the air will leave the block in the form of innumerable bubbles which are extremely minute and which are all substantially of the same size. Such bubbles are much finer and more uniform than I have found it possible to obtain through the use of any woven fabric, or in fact any other medium than a vegetable growth provided with natural pores, such as wood.

Figure 2:
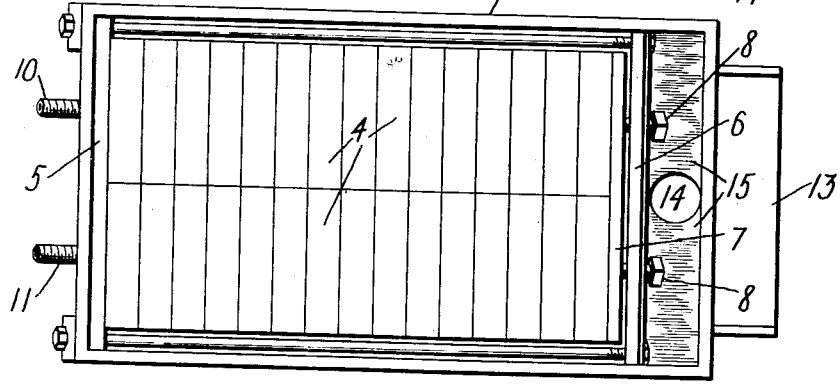
Figure 3:
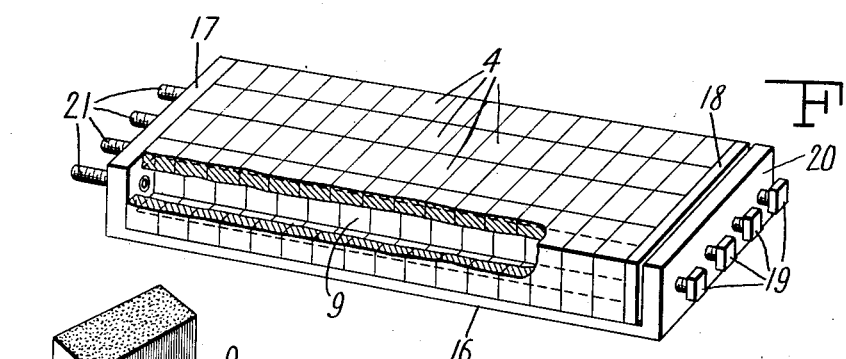
Figure 4:
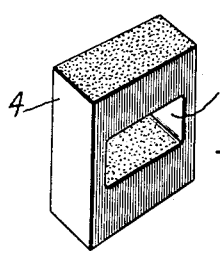
Figure 5:
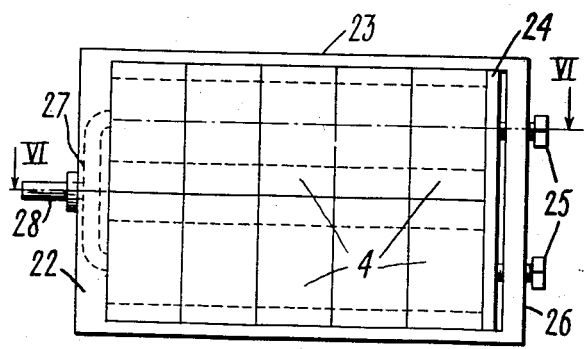
Figure 6:
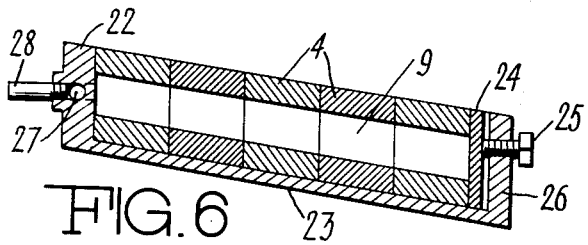
Figure 7:
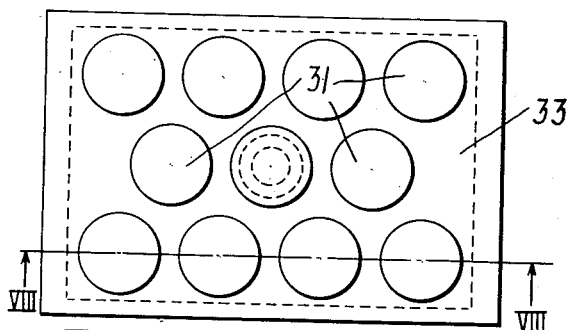
Figure 8:
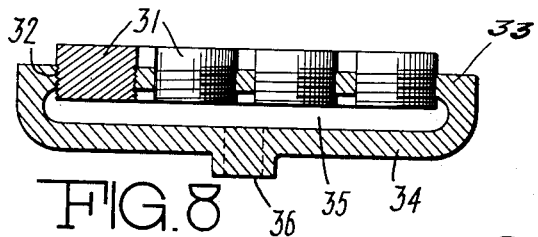
Figure 13:
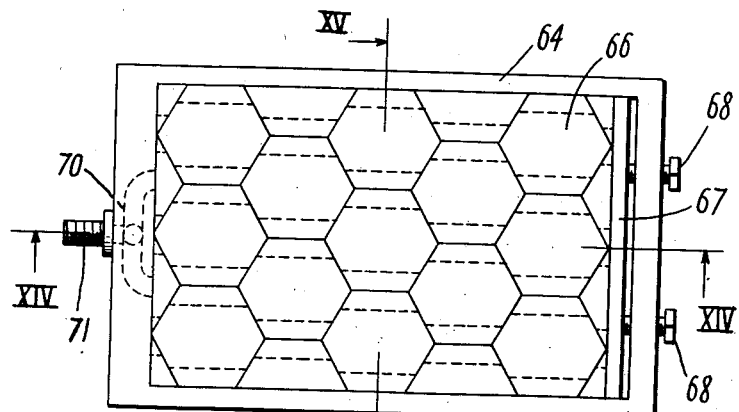
Figure 14:
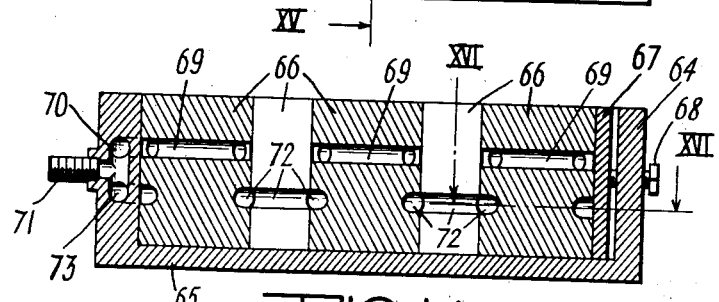

In the accompanying drawings, which form a part of this application, Figure 1 is a vertical sectional view of one type of apparatus embodying my invention as applied to a tank adapted for the practice of the flotation process of recovering ore. Figure 2 is a plan view of the device shown in Figure 1. Figure 3 is a perspective view, parts being shown in section, of a modified form of unit for use as a flotation bottom. Figure 4 is a perspective view of a block of wood or the like adapted for use in connection with my invention. Figure 5 shows a modified form of flotation unit. Figure 6 is a sectional view on line VI—VI of Figure 5. Figure 7 is a plan view of a further modification. Figure 8 is a sectional view on line VIII—VIII of Figure 7. Figure 9 is a plan view of a further modified form of my device. Figure 10 is a sectional view on line X—X of Figure 9. Figure 11 is a sectional view on line XI—XI of Figure 9. Figure 12 is a diagram of one arrangement of blocks such as are shown in Figures 7, 8, 9, 10, and 11, indicating the substantially uniform distribution of aeration over the entire surface. Figure 13 is a plan view of an aeration unit showing the use of hexagonal wooden blocks. Figure 14 is a sectional view on line XIV—

Figure 16:
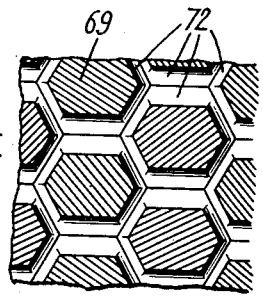
Figure 15:
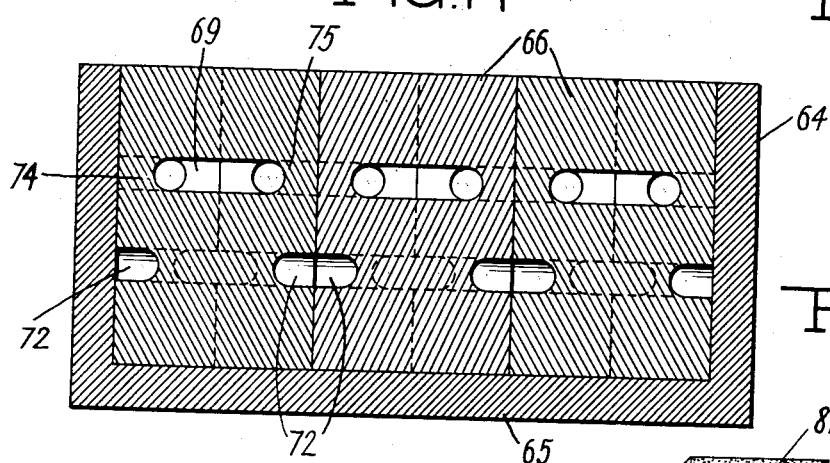
Figure 17:
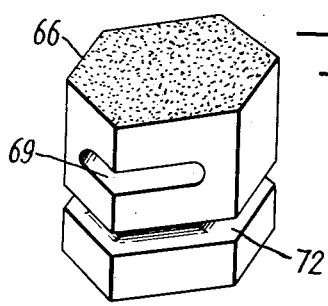
Figure 18:
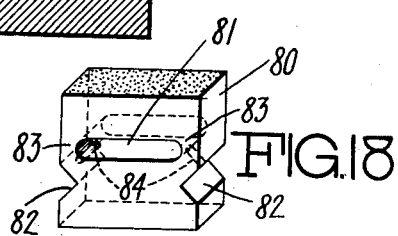

XIV of Figure 13. Figure 15 is a sectional view on line XV—XV of Figure 13 on an enlarged scale. Figure 16 is a sectional view on line XVI—XVI of Figure 14. Figure 17 is a perspective view of one of the blocks illustrated in Figures 13 to 16 inclusive. Figure 18 is a perspective view of a modified form of block. Figure 19 is a vertical sectional view of a modified form of device for adapting my invention to the purpose of ore filtration or the like. Figure 20 is a top view of the device shown in Figure 19. Figure 21 is a diagrammatic sectional view on line XXI—XXI of Figure 19. Figure 22 is a diagrammatic view partly in section of a device designed to collect aerated liquid and to store it under pressure and to deliver the same as needed; and Figures 23 and 24 show an elevation and end view, respectively, of a modified type of block.

Referring to the drawings in detail, the numeral 1 designates a tank suitable for ore flotation purposes. This tank is provided with a sloping bottom 2 which is covered by a false bottom 3. This latter consists of a plurality of blocks of wood 4 clamped in place between the heads 5 and 6 by means of a bar 7 which is engaged by the stud bolts 8. Each of the blocks 4 preferably consists of a single piece of wood with the grain vertical, as indicated in Figure 4, and each block is provided with a central bore or passage 9. These passages in the various blocks align, forming a continuous opening communicating either with the pipe 10 or the pipe 11, both of which are connected to a compressed air supply. When my invention is applied to ore flotation in connection with the apparatus just described, the ore pulp flows out of the chute 12 into the tank 1, which is filled with water. The admission of compressed air to the pipes 10 and 11 causes the aligning passages 9 in the blocks 4 to be filled with compressed air, the only outlet for which is upward through the wood. The result is that since the grain of the wood is vertical, the compressed air finds its way out through the vertical pores of the wood and emerges from the surface of the false bottom 3 in the form of millions of minute bubbles. These bubbles slowly rise in the water which fills the tank 1 and in doing so encounter the particles of ore which are settling to the bottom by gravity. Through a peculiar phenomenon which is not thoroughly understood, the bubbles attach themselves only to particles of mineral which it is desired to recover, such, for instance, as metallic sulfids, and not to the particles of gangue, which latter are consequently permitted to fall to the bottom of the tank. Each of the millions of bubbles acts as a tiny balloon and carries with it to the surface any particles of mineral to which it may have attached itself. The mineral is thus separated from the gangue and rises with the bubbles to the surfaces of the liquid within the tank. There is a constant circulation in the tank, the ore pulp entering from the chute 12 and the practically pure mineral passing from the tank through the outlet 13. The bottom of the tank is preferably made sloping, as shown in Figure 1, so that the gangue or tailings will slide down toward the forward end of the tank whence they will be collected through the opening 14 in the sloping bottom portion 15.

In Figure 3, I have shown a modified form of construction in which the blocks 4 are more nearly square and are held in place in a U-shaped frame 16, being clamped against the head 17 by means of the bar 18 which is adjusted by means of the bolts 19 passing through the head 20. As before, the blocks 4 are provided with passages 9 leading to compressed air supply pipes 21.

Figures 5 and 6 illustrate a further modification particularly adapted for use in a tank with a slanting bottom. In this case, the blocks 4 are provided as before with passages 9, and in this instance they are clamped against the head 22 of a rectangular frame 23 by means of a bar 24 adjusted by the set screws 25 passing through the head 26 of the frame. The head 22 is provided with a branched cored-out passage 27, one end of which communicates with the aligning passages in one row of blocks and the other end with the passage through the other row of blocks. The compressed air supply pipe 28 leads to this cored-out passage 27. The blocks are sawed so that the pores are vertical.

In the devices so far described, the compressed air is prevented from escaping between the edges of adjacent blocks by finishing these blocks off smooth and clamping them tightly together in the frames. As soon as the blocks are immersed in water, they will, of course, tend to swell and this will aid in forming an air tight joint between them. If desired, the blocks may be treated with oil to prevent their absorbing too much water.

In Figures 7 and 8, I have shown a further modification in which round wooden plugs are used in place of the rectangular blocks shown in the preceding figures. These plugs 31 are preferably screw-threaded at 32 and are screwed into threaded holes in a plate 33 forming part of a metallic base 34. This base is cored out at 35 to form an air passage communicating with the bottoms of the plugs, and air is admitted to this passage at 36.

Figures 9, 10, 11 and 12 illustrate a somewhat different method of supporting the wooden blocks. In this type of device, a base 49 is provided with a peripheral upstanding flange 50. To this flange is secured a relatively thin metal plate 51, provided with a plurality of perforations 52. These perforations are preferably tapered or frusto-conical in form, the outside diameter being slightly smaller than the inside diameter. Into each of these perforations is forced a tapered wooden plug 53 and the unit thus formed is secured to the upstanding flange 50 by means of bolts 54 along two sides and a grid consisting of side flanges 55 and 56 and cross bar 57, the grid being secured to the base by means of the stud bolts 58 passing through the flanges 55 and 56. Suitable gaskets 59 are provided for ensuring an air-tight joint between the plate 51 and the flange 50. Each of the grid bars 57 is provided with a plurality of depending pins 60 adapted to engage the surface of the plate 51 between the blocks 53 and thereby to support the plate against distortion in a direction away from the base 49. Compressed air or other gas under pressure is admitted to the space 61 between the base 49 and the plugs through any suitable openings such as the pipe 62. Owing to the lack of stiffness in the plate 51, the supporting grid with its bars set on edge is required to prevent outward buckling of the plate under the presure of the gas admitted to the space 61. It will be observed that the pressure of the air only forces the plugs more tightly into their respective holes. In order to insert as many plugs as possible in the plate 51 without unduly weakening it, the plugs are preferably arranged in staggered relation as indicated in Figure 9. Figure 12 shows how dead or inactive spaces may still be further avoided by introducing semi-circular plugs 63 at the edges of the plate 51.

The subject matter shown in Figures 7 to 12 inclusive, and herein described, is not herein specifically claimed since it has been made the subject of a continuing application filed by me, Serial No. 346,148, filed December 19, 1919.

Figures 13 to 17 inclusive, illustrate the use of hexagonal blocks in connection with a containing frame similar to that illustrated in Figure 5. In this form of device, a rectangular frame 64 is provided having the bottom 65, and within this frame is supported a plurality of hexagonal blocks 66, which are adapted to be clamped in place by means of a movable bar 67, which in turn is adjusted by means of the bolts 68. Each of the blocks 66 is provided with a central passage 69, which corresponds in function to the passage 9 in the blocks previously described, and it will be seen that these passages are of sufficient width to form ample communication between adjacent blocks, although they do not align in the same way as do the passages 9. The air is adapted to be supplied to these passages through the upper branch of a manifold 70 fed through an inlet pipe 71. Each of the blocks is also provided with a peripheral groove 72 below the passage 69. The depth of this groove is equal to or slightly greater than the distance from the side walls of the passage 69 to the nearest vertical surface of the block. These grooves 72 form a series of intercommunicating passages, as clearly shown in Figure 16, and this series of passages is fed with compressed air or other gas under pressure from the lower branch 73 of the manifold above referred to. The purpose of the grooves 72 is to cause air or other gas under pressure to pass vertically upward through the entire cross-sectional area of the block. Since the block is always placed with the grain vertical, there is no tendency for the air to spread laterally from the passage 69, and consequently this creates a dead space 74 and 75 on each side of the passage 69. This would mean that no bubbles would be produced from the area of the wood directly above the dead spaces 74 and 75, and consequently this area would be useless so far as bubble production was concerned. To overcome this, I provide a groove 72 which underlies the dead spaces 74 and 75. When air or other gas pressure is admitted to these grooves, it will pass vertically upward through the pores of the wood, and while it has a somewhat longer journey through the wood than the air leaving the passage 69, still the thickness of the wood is not sufficient to interfere with the passage of the air even from the grooves 72. By this construction, I make the entire surface area of the block active for bubble production.

In Figure 18, I have shown a similar plan of utilizing the entire cross-sectional area applied to a block of rectangular or quadrangular cross-section. In this figure, the numeral 80 designates a block provided with a centrally disposed passage 81 which extends only part way across the block. Below this passage at each side of the block is a groove 82, the depth of which is preferably equal to or greater than the space 83 between the edge of the passage 81 and the nearest side of the block. While it is obvious that in this form of block the air may be admitted to the passages formed by the adjacent grooves 82 by means of an inlet manifold, such as the manifold 73 shown in Figure 14, this manifold may be done away with by providing passages 84 leading from the bore 81 to the grooves 82 and supplying air to them.

Figures 19, 20 and 21 illustrate a modified construction of my device as applied to the flotation of ore in which the bubbles are created in a central drum, which may be caused to rotate or not as desired. In this construction, 85 is a cylindrical tank to which the ore pulp is supplied through the chute 86 and from which the ore is adapted to be discharged through the chute 87. The tank is provided with a conical bottom 88 from which the tailings may be discharged through the pipe 89 controlled by the valve 90. Within the tank 85 is a drum 91, the side 92 of which is composed of wooden sections or staves held together by the rings 93, the whole being mounted upon a pipe 94 which is rotatably supported in a bearing 95. The section of the pipe within the drum is perforated at 96 and compressed air or other gas under pressure may be supplied to the upper end of the pipe in any suitable manner as through a stuffing box or slip-joint connection (not shown). The upper end of the pipe is also preferably provided with some means by which it and the drum may be rotated, such for instance, as the pulley wheel 97. It will be seen that compressed air will enter the interior of the drum through the perforations in the pipe 94 and its only avenue of escape will be through the wooden sides of the drum. In this instance the grain of the wood will be arranged radially of the drum, so that the air will be discharged radially, escaping into the water in the form of minute bubbles. In some instances, it will be found desirable to rotate the drum while air is being supplied to it, in order to obtain the effect of centrifugal force in throwing off the bubbles from the surface of the drum as fast as the air forces its way through the wood.

Figure 22 illustrates diagrammatically a system of collecting the bubbles formed by a unit such as that illustrated in Figure 3. In this case, compressed air is introduced into the pipe 21 and upon passing through the pores of the wood blocks 4, emerges from the surface of the blocks in the form of bubbles as shown. These bubbles are collected in a submerged conical hood 100, the small end of which is connected to the intake pipe 101 of a pump 102. The discharge end of the pump is connected by a pipe 103 to a tank 104 which may be provided with a pressure gage 105. The pipe 106 leads from this tank to the place where the aerated water or other liquid is desired. In the diagram this is indicated as a conical flotation tank 107 which is designed to be fed with ore pulp from the chute 108 and which is provided with an outlet chute 109. The pipe 106, which may be controlled by a valve 110, terminates within the tank at a point near the bottom thereof. Adjacent to the orifice of the pipe, there may be a baffle plate 111, the function of which is to divert the bubbles upward as they are released from the pipe. It is a well-known fact that a liquid under pressure is able to hold in suspension a much greater quantity of gas than the same volume of liquid at atmospheric pressure. Consequently, the liquid under pressure in the tank 104 will contain a relatively greater amount of air, and when this liquid is released, upon flowing from the pipe 106, this air will re-appear in the form of a multitude of minute bubbles.

Figures 23 and 24 show a modified form of block construction in which the block 120 is perforated with a series of holes or passages 121, beneath which is a second series of holes 122, preferably smaller and staggered with relation to the others. This gives the same benefit as the block of Figures 13 to 17 in utilizing the entire cross-sectional area of the block, and at the same time is easy to construct. The blocks may be provided with shallow grooves 123 affording communication between the two series of holes, and also ensuring the free passage of air through a bank of blocks even though the holes do not register or aline perfectly for any reason, such as faulty workmanship or assembling.

In practicing my invention, I find I can control the size of the bubbles and rate of passage of gas by several simple methods as (a) by varying the air pressure, (b) by varying the distance between the air passage and the surface of the block, (c) by using different kinds of wood, as for instance using white wood or poplar for very fine bubbles, maple or pine for medium size bubbles, or chestnut for very large bubbles, or (d) I may treat the wood with caustic soda, oil or other liquids to vary its diffusing properties.

In the various processes to which I have indicated my invention to be applicable, it is desirable that the bubbles be extremely minute for several reasons. In general the greater the number of bubbles, the greater the bubble surface produced by a given quantity of air, which is an important consideration in those processes where intimate contact of the air with the liquid is essential. In those processes in which it is desired to use the bubbles to overcome the gravity of particles which otherwise would fall to the bottom of a tank, a great number of small bubbles is desired in order that the interstices between the bubbles may be reduced to a minimum, so that there may be no spaces between the bubbles through which particles may pass without having a chance to attach themselves to a bubble and thus be drawn to the surface. Again, the smaller the bubble the longer the time required for it to rise to the surface. This may roughly be stated to follow from the fact that the displacement of the bubble and consequently the force tending to cause it to rise depends upon and varies as the cube of the diameter, whereas the surface friction which opposes the rapid rise of the bubbles varies only as the square of the diameter. In other words, the displacement depends upon the volume whereas the surface friction depends upon the superficial area, so that the force tending to cause the bubble to rise increases much more rapidly with the increase in the size of the bubble than does the friction which tends to hold it back.

In all the modifications described, in which the blocks have passages formed therein I prefer to seal the pores on the under surface of the block with paraffin, varnish or other material to render this surface non-porous. This prevents escape of air and does away with any tendency for the air to force the blocks upward away from their support and into the liquid in which they are submerged. The sealing process may be advantageously carried on by coating the under surface and applying a vacuum to the passages through the blocks. I may also use shellac, varnish or a similar material as a gasket between the blocks.

Furthermore, it will be observed that by coring the blocks of wood so as to form when in alignment, a continuous passageway for the air, it is possible to closely group and make them self-sustaining without other means of support than the exterior holding frame since the pressure of the entering air is applied equally to all walls of the block sections with no tendency to dislodge or displace them as would be the case if the pressure were admitted beneath the lower surface of the blocks.

I have found that different vegetable growths, such for instance, as many kinds of wood, have widely varying degrees of porosity, and in those instances, where both large and small bubbles are useful, different woods can be alternated to advantage, such for instance as pine and chestnut, or maple and white wood. I have also found that it is possible to control accurately the rate of air discharge by varying either the pressure of the air supplied to the blocks or by varying the thickness of the wood through which the air must pass before reaching the surface of the liquid.

For the purposes of illustration, I have described one application of the principles of my invention in connection with wooden blocks but manifestly said principles are applicable to other materials of a porous nature. I may where circumstances might require employ such substitute for the wood as porous stone and still obtain the advantages of the invention.

While I have illustrated and described only certain preferred embodiments of my invention and their application to certain processes, I realize that my invention is susceptible of broad application and I do not desire to be limited to the precise structures shown and described.

Having thus described my invention, I claim:

1. In apparatus of the class described, a gas diffusing member including a frame, a plurality of porous blocks mounted in said frame and abutting each other, said blocks being held in said frame by frictional engagement with each other and said frame, and means for passing gas under pressure through said blocks.

2. In apparatus of the class described, a gas diffusing member including a frame, a plurality of porous blocks mounted in said frame, certain of said blocks having a frictional engagement with said frame and the other of said blocks frictionally engaging each other and said first-mentioned blocks, all of said blocks being maintained in said frame by said frictional engagement, and means for passing gas under pressure through said blocks.

3. In apparatus of the class described, a gas diffusing member including a frame, a plurality of porous blocks mounted in said frame and abutting each other, certain of said blocks also abutting against the said frame, the abutting faces of said blocks being flat and unconnected, and all of said blocks being held in said frame by frictional engagement of said abutting faces with each other and said frame, and means for passing gas under pressure through said blocks.

4. In apparatus of the class described, a gas diffusing member including a frame, a plurality of abutting blocks mounted in said frame and held in position by frictional engagement, each of said blocks being provided with a passage therethrough, and means for supplying gas under pressure to said passages.

5. In apparatus of the class described, a gas diffusing member including a frame, a plurality of abutting porous blocks mounted in said frame and held therein by frictional engagement, each of said blocks being provided with a passage therethrough intersecting the pores of said blocks, and means for supplying gas under pressure to said passages.

6. In apparatus of the class described, a wall comprising a plurality of porous blocks having two series of passage-ways extending therethrough for the reception of gas under pressure, the passage-ways of said two series being so positioned with respect to one another that the gas will issue from the exposed surface of the wall throughout substantially the entire extent thereof.

7. In apparatus of the class described, a wall comprising a plurality of porous blocks having two series of passage-ways extending therethrough for the reception of gas under pressure, the passage-ways of one of said series registering with the spaces between the passage-ways of the other of said series.

8. In apparatus of the class described, a wall comprising a plurality of wood blocks and having a series of passage-ways therethrough for the admission of gas under pressure and provided with a second series of passage-ways intersecting pores of the wood which are not intersected by the first series of passage-ways.

9. In apparatus of the class described, a wall comprising a plurality of wood blocks and having a series of passage-ways therethrough for the admission of gas under pressure and provided with a second series of passage-ways intersecting pores of the wood which are not intersected by the first series of passage-ways, and means for providing communication between the two series of passage-ways.

10. In apparatus of the class described, a plurality of wood blocks, each provided with openings therein aligning to form a series of continuous passage-ways through the assembled blocks, said openings being substantially cross-wise of the grain of the wood, the assembled blocks being provided with a second series of openings intersecting pores of the wood not intersected by the first series of openings.

11. In apparatus of the class described, a plurality of wood blocks, each provided with a passage therethrough communicating with the passage of adjacent blocks to form a passage through the assemblage of blocks, a second series of passages through the assemblage of blocks arranged in an offset plane with respect to the first mentioned passages, said second named passage-ways communicating with each other and intersecting pores of the wood not intersected by the first mentioned passage-ways, and means for supplying gas under pressure to said passage-ways.

12. In apparatus of the class described, a plurality of wood blocks, each provided with a passage therethrough communicating with the passage of adjacent blocks to form a passage through the assemblage of blocks, a second series of passages through the assemblage of blocks arranged in an offset plane with respect to the first mentioned passages, said second named passage-ways communicating with each other and intersecting pores of the wood not intersected by the first mentioned passage-ways, means for affording communication between the two series of passage-ways, and means for supplying gas under pressure to said passage-ways.

13. In apparatus of the class described, a gas diffusing unit comprising a unitary block of porous material having a plurality of passages extending therethrough in superposed planes.

14. In apparatus of the class described, a gas diffusing unit including a frame, a plurality of porous blocks arranged in said frame, each of said blocks being provided with a plurality of passages arranged in superposed planes communicating with each other, and means for supplying gas under pressure to said passages.

15. In apparatus of the class described, a gas diffusing unit including a frame, a plurality of porous blocks arranged in said frame, said plurality of blocks being provided with a plurality of series of passages arranged in superposed planes, and being provided with means for establishing communication between said series of passages and means for supplying gas under pressure to said passages.

16. In apparatus of the class described, a gas diffusing unit including a frame, a block of porous material mounted in said frame and held in position by frictional engagement with the said frame, said block being provided with a passage through the body thereof intersecting the pores.

17. In apparatus of the class described, a container for liquid, a porous bottom for said container having a passage through the body thereof intersecting the pores, and having one side thereof hermetically sealed to prevent escape of gas from said passage, and means for supplying gas under pressure to said passage.

18. In apparatus of the class described, a container for liquid, a false bottom mounted in said container, comprising a porous block having a passage through the body thereof intersecting the pores, the surface of said block adjacent the bottom of the container being hermetically sealed, and means for supplying gas under pressure to said passage.

19. In apparatus of the class described, a gas diffusing member including a series of aligned porous blocks, means engaging the end blocks of the series to hold the blocks in alignment and against relative lateral movement thereof, and means for passing gas under pressure through said blocks.

20. In apparatus of the class described, a gas diffusing member including a series of aligned porous blocks, means for holding said blocks in frictional engagement with one another with sufficient force to prevent said blocks from moving out of alignment, and means for passing gas under pressure through said blocks.

21. In apparatus of the class described, a gas diffusing member including a support, a plurality of abutting porous blocks upon said support, said blocks being free from connection with said support and with one another except through frictional engagement, releasable means for holding said blocks from movement relative to said support and to each other, and means for passing gas under pressure through said blocks.

22. In apparatus of the class described, a gas diffusing member including a support, a series of aligned porous blocks upon said support and held against movement relative to said support and to one another solely by frictional engagement with one another, and means for passing gas under pressure through said blocks.

23. In apparatus of the class described, a gas diffusing member including a plurality of porous blocks having passages formed therein and arranged in different planes, and means for introducing gas under pressure into said passages.

24. In apparatus of the class described, a gas diffusing member including a plurality of porous blocks having passages formed therein and positioned in planes parallel to one another and to the exposed surface of the blocks, and means for introducing gas under pressure into said passages.

ERNEST J. SWEETLAND.